United States Patent
Deng et al.

(10) Patent No.: US 10,961,066 B2
(45) Date of Patent: Mar. 30, 2021

(54) SYSTEM AND METHOD FOR FEEDING DIAPHRAGM

(71) Applicants: Tyco Electronics (Shanghai) Co. Ltd., Shanghai (CN); Measurement Specialties (China) Ltd., Shenzhen (CN); Innogetic Technology Co., Ltd., Zhuhai (CN)

(72) Inventors: Yingcong Deng, Shanghai (CN); Ziqing Liao, Shanghai (CN); Ke Ning, Shanghai (CN); Dandan Zhang, Shanghai (CN); Lvhai Hu, Shanghai (CN); Kok Wai Wong, Shanghai (CN)

(73) Assignees: Tyco Electronics (Shanghai) Co. Ltd., Shanghai (CN); Measurement Specialties (China) Ltd., Shenzhen (CN); Innogetic Technology Co., Ltd., Zhuhai (CN)

( * ) Notice: Subject to any disclaimer, the term of this patent is extended or adjusted under 35 U.S.C. 154(b) by 0 days.

(21) Appl. No.: 16/512,579

(22) Filed: Jul. 16, 2019

(65) Prior Publication Data

US 2019/0337736 A1 Nov. 7, 2019

Related U.S. Application Data

(63) Continuation of application No. PCT/IB2018/050240, filed on Jan. 15, 2018.

(30) Foreign Application Priority Data

Jan. 16, 2017 (CN) .......................... 201710029102.X

(51) Int. Cl.
  *B65G 59/02* (2006.01)
  *B65H 3/02* (2006.01)
  *B65H 3/46* (2006.01)

(52) U.S. Cl.
  CPC ............... *B65H 3/02* (2013.01); *B65G 59/02* (2013.01); *B65H 3/46* (2013.01)

(58) Field of Classification Search
  CPC .... B65H 3/60; B65H 3/46; B65H 2301/4228; B65H 2301/4231; B65H 2301/4233;
  (Continued)

(56) References Cited

U.S. PATENT DOCUMENTS

| | | | | |
|---|---|---|---|---|
| 1,871,276 A | * | 8/1932 | Paterson | .................. A21B 3/18 198/477.1 |
| 2,143,518 A | * | 1/1939 | Kolin | .................... B29D 19/06 414/675 |

(Continued)

FOREIGN PATENT DOCUMENTS

| EP | 0951968 A3 | 4/1999 |
|---|---|---|
| EP | 0951968 A2 | 10/1999 |

OTHER PUBLICATIONS

PCT Notification, International Search Report and Written Opinion of the International Searching Authority, Intl App No. PCT/IB2018/050240, dated Apr. 20, 2018, 15 pages.

*Primary Examiner* — Gregory W Adams
(74) *Attorney, Agent, or Firm* — Barley Snyder

(57) ABSTRACT

A system for feeding a diaphragm comprises a diaphragm separating device adapted to separate a single diaphragm from a stack of diaphragms and a visual device adapted to identify the single diaphragm and a position of the single diaphragm separated from the stack.

15 Claims, 2 Drawing Sheets

(58) Field of Classification Search
CPC .. B65H 2301/4234; B65H 2301/42344; B65H 3/242; B65H 3/322; B65H 3/24; B65G 59/02; B65G 59/00; B65G 59/005
See application file for complete search history.

(56) References Cited

U.S. PATENT DOCUMENTS

| | | | | |
|---|---|---|---|---|
| 2,285,224 A * | 6/1942 | Nigra | ............ | B65H 3/02 271/42 |
| 2,483,207 A * | 9/1949 | Joseph | ............ | A61J 7/02 141/367 |
| 3,291,480 A * | 12/1966 | Haddad | ............ | A41H 43/02 271/1 |
| 3,768,675 A | 10/1973 | Argyres | | |
| 4,132,400 A * | 1/1979 | Naramore | ............ | B65H 31/40 271/211 |
| 4,153,240 A * | 5/1979 | Gouley | ............ | B65H 3/20 493/419 |
| 4,453,873 A | 6/1984 | Curti | | |
| 4,803,735 A * | 2/1989 | Nishida | ............ | G06K 9/46 382/151 |
| 4,928,947 A * | 5/1990 | Beery | ............ | B65H 3/02 271/24 |
| 4,978,113 A * | 12/1990 | McAuley | ............ | B65H 3/24 271/10.14 |
| 4,988,264 A | 1/1991 | Winski | | |
| 5,890,579 A * | 4/1999 | Young | ............ | B65G 21/2054 198/459.6 |
| 5,987,591 A * | 11/1999 | Jyumonji | ............ | B25J 9/1697 700/259 |
| 6,113,092 A * | 9/2000 | Greive | ............ | B65D 3/02 271/113 |
| 6,311,826 B1 * | 11/2001 | Tischler | ............ | B21C 51/00 198/395 |
| 6,626,427 B2 * | 9/2003 | Choi | ............ | B65H 3/0638 271/109 |
| 7,645,111 B2 * | 1/2010 | Mori | ............ | B65G 49/061 198/721 |
| 2003/0155701 A1 | 8/2003 | Bakodledis | | |
| 2010/0236894 A1 * | 9/2010 | Helm | ............ | B65G 59/04 198/460.2 |

* cited by examiner

SYSTEM AND METHOD FOR FEEDING DIAPHRAGM

CROSS-REFERENCE TO RELATED APPLICATIONS

This application is a continuation of PCT International Application No. PCT/IB2018/050240, filed on Jan. 15, 2018, which claims priority under 35 U.S.C. § 119 to Chinese Patent Application No. 201710029102.X, filed on Jan. 16, 2017.

FIELD OF THE INVENTION

The present invention relates to a system for an electrical diaphragm and, more particularly, to a system for feeding a diaphragm.

BACKGROUND

Diaphragms in the electronics industry generally are formed as very thin metal pieces. During manufacturing and selling, the diaphragms usually are stacked together, and placed and sold in stacks. As a result, when using the diaphragm, it is necessary to separate a single diaphragm from stacks of diaphragms. However, the diaphragms are easy to damage or fold since they are very thin, and thus separation of diaphragms with high efficiency and quality is a challenging process.

In the prior art, there are no such devices adapted to separate a single diaphragm from stacks of diaphragms with high efficiency and quality. Instead, a single diaphragm is manually separated from stacks of diaphragms, which lowers separation efficiency of the diaphragm, increases a likelihood of damaging the diaphragm, and reduces the quality of the diaphragm.

SUMMARY

A system for feeding a diaphragm comprises a diaphragm separating device adapted to separate a single diaphragm from a stack of diaphragms and a visual device adapted to identify the single diaphragm and a position of the single diaphragm separated from the stack.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
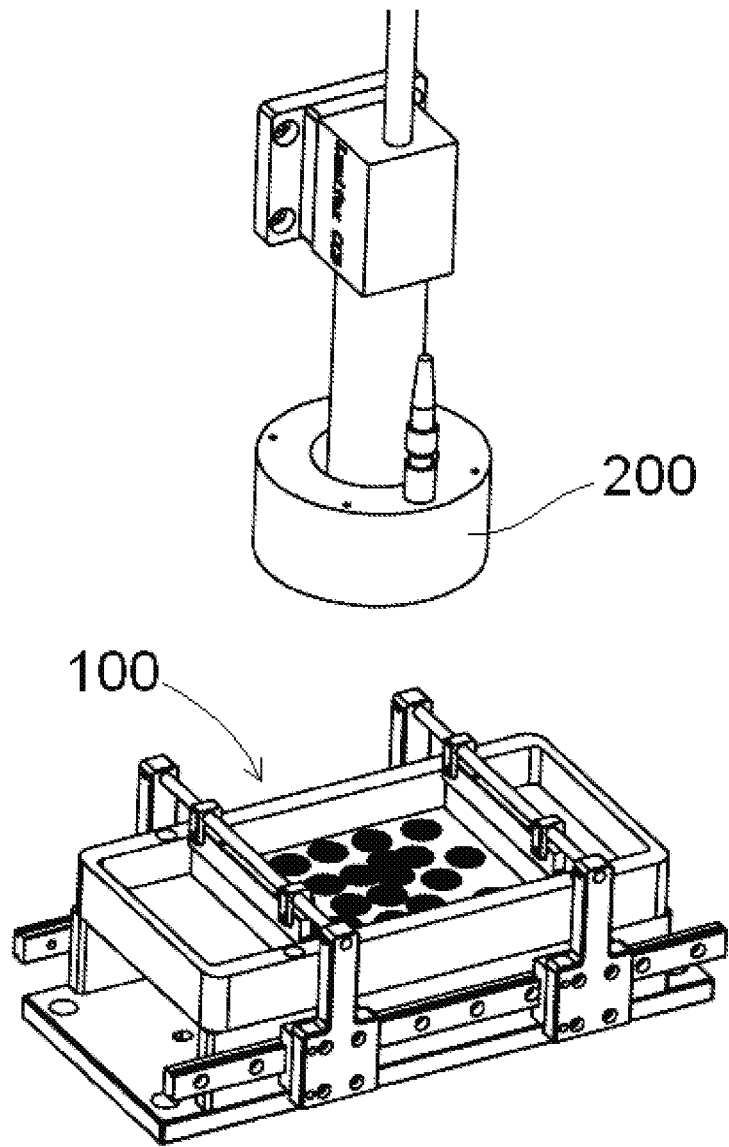
FIG. 1 is a perspective view of a system for feeding a diaphragm according to an embodiment.

The technical solution of the present disclosure will be described hereinafter in further detail with reference to embodiments, taken in conjunction with the accompanying drawings. In the specification, the same or similar reference numerals indicate the same or similar parts. The description of the embodiments of the present disclosure hereinafter with reference to the accompanying drawings is intended to explain the general inventive concept of the present disclosure, and should not be constructed as a limitation to the present disclosure.

In addition, in the following detailed description, for the sake of explanation, numerous specific details are set forth in order to provide a thorough understanding of the disclosed embodiments. It will be apparent, however, one or more embodiments may also be practiced without these specific details. In other instances, well-known structures and devices are illustrated schematically in order to simplify the drawing.

A system for feeding a diaphragm, as shown in FIG. 1, comprises a diaphragm separating device 100 and a visual device 200. The diaphragm separating device 100 is adapted to separate a single diaphragm 10 from at least one stack of diaphragms 10. The visual device 200 is adapted to identify the separated single diaphragm 10 and the position of the separated single diaphragm 10.

Figure 2:
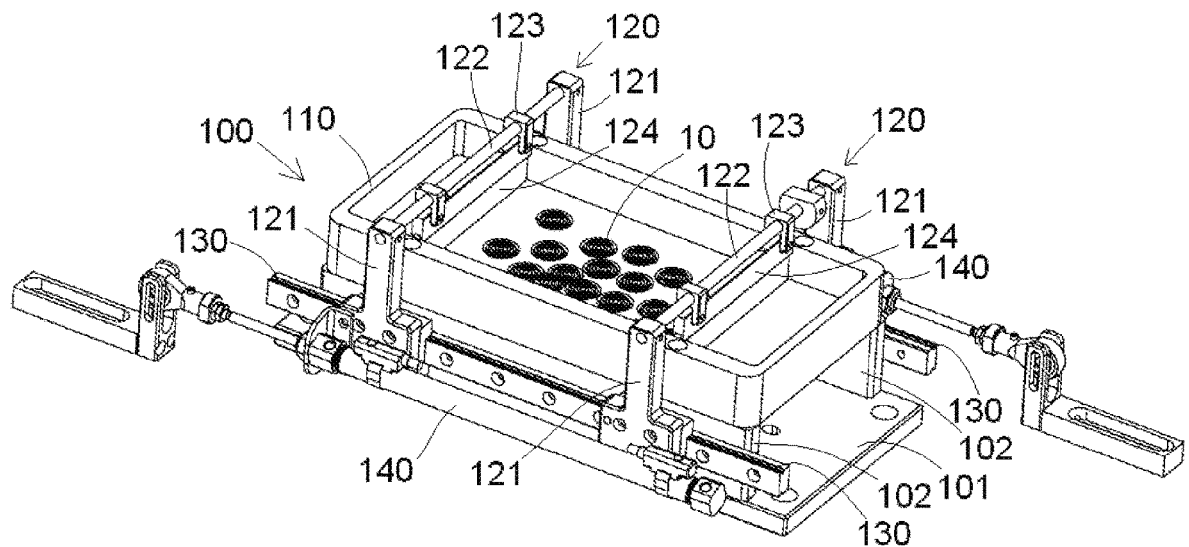
FIG. 2 is a perspective view of a diaphragm separating device of the system of FIG. 1.
Figure 3:
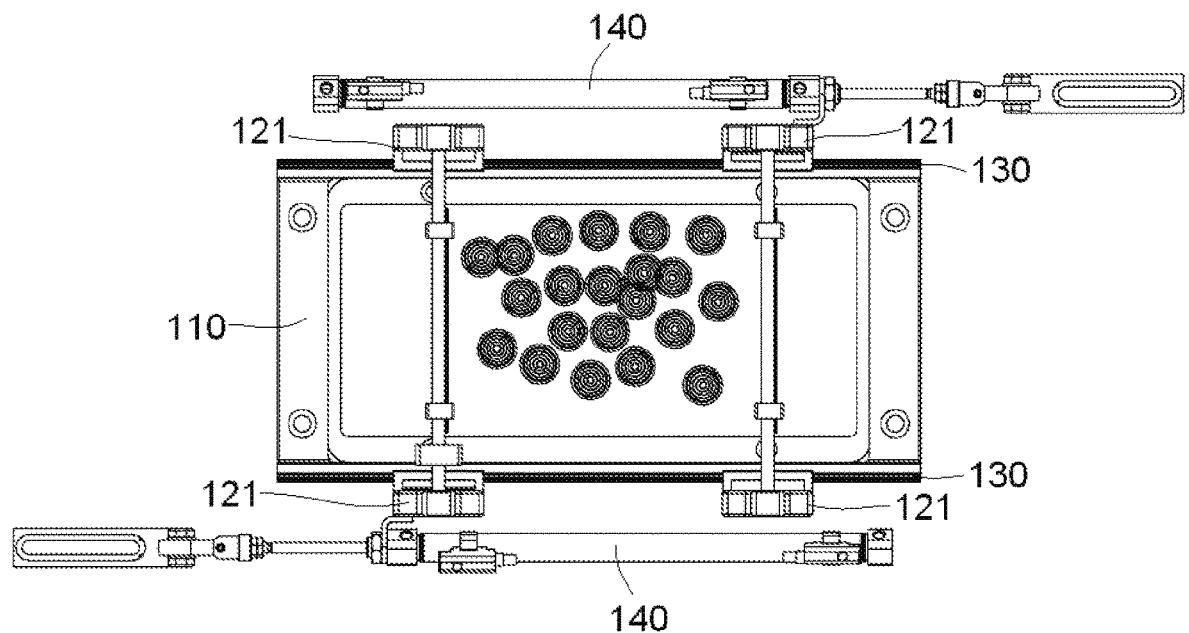
FIG. 3 is a plan view of the diaphragm separating device of FIG. 2.

As shown in FIGS. 2-3, the diaphragm separating device 100 includes a diaphragm bin 110 and a diaphragm sweeping mechanism 120. At least one stack of diaphragms 10 is loaded in the diaphragm bin 110. In an embodiment, an interior bottom surface of the diaphragm bin 110 is flat, so that a stack of or stacks of diaphragms 10 may be placed and stacked on the interior bottom surface of the diaphragm bin 110. The diaphragm sweeping mechanism 120 is adapted to sweep a top of at least one stack of diaphragms 10, in order to separate the single diaphragm 10 from the top of at least one stack of diaphragms 10 and arrange the separated diaphragm 10 at a new position, so that the separated diaphragm 10 may be picked up by the robot 300.

In the shown embodiment, the diaphragm separating device 100 includes a plurality of diaphragm sweeping mechanisms 120. As shown in FIGS. 2-3, each diaphragm sweeping mechanism 120 includes a support frame 121, 122, 123 and a sweeping brush 124. The support frame 121, 122, 123 is adapted to move back-and-forth in a straight line, for example, move reciprocally in a left-right direction in FIG. 3. The sweeping brush 124 is installed on the support frame 121, 122, 123 and adapted to move back-and-forth along with the support frame 121, 122, 123. When moving back-and-forth along with the support frame 121, 122, 123, the sweeping brush 124 sweeps the top of at least one stack of diaphragms 10 in order to separate the single diaphragm 10 from the top of at least one stack of diaphragms 10.

As shown in FIGS. 2-3, a pair of sliding rails 130, 130 are arranged on both sides of the diaphragm bin 110 and extend in a straight line parallel to the axis of the diaphragm bin 110. The support frame 121, 122, 123 is slidably installed on a pair of sliding rails 130, 130, so as to move reciprocally along a pair of sliding rails 130, 130.

As shown in FIGS. 2-3, the support frame 121, 122, 123 includes a pair of support vertical arms 121, 121 and a support transverse arm 122. Lower portions of a pair of support vertical arms 121, 121 are slidably installed on the pair of sliding rails 130, 130, respectively. The support transverse arm 122 is connected at a pair of opposite ends thereof to a pair of upper portions of a pair of support vertical arms 121, 121. The sweeping brush 124 is mounted on the support transverse arm 122.

As shown in FIGS. 2-3, the support frame 121, 122, 123 further includes a pair of brush connecting parts 123, 123 installed on the support transverse arm 122. The pair of brush connecting parts 123, 123 is adapted to be connected to a pair of ends of the sweeping brush 124, such that the sweeping brush 124 is installed in a suspended manner on the support transverse arm 122.

In an embodiment, the support frame 121, 122, 123 is configured to be height-adjustable so that the sweeping brush 124 installed on the support frame 121, 122, 123 is height-adjustable, causing height of the sweeping brush 124 matched with the diaphragm 10 to be separated. For example, if the diaphragm 10 to be separated has a thinner thickness, a height of the sweeping brush 124 is lowered; if the diaphragm 10 to be separated has a thicker thickness, the height of the sweeping brush 124 is increased. In this way, the height of the sweeping brush 124 may be matched with the diaphragm 10 to be separated, improving efficiency of separating diaphragms 10.

As shown in FIGS. 2-3, the system further includes a linear actuator 140 adapted to drive a corresponding set of diaphragm sweeping mechanism 120 to move back-and-forth in a straight line. In the shown embodiment, the system includes a pair of linear actuators 140. Each linear actuator 140 is connected to one of two support vertical arms 121, 121 of the corresponding set of diaphragm sweeping mechanism 120, in order to drive the support vertical arms 121, 121 to move back-and-forth along the sliding rails 130, 130. In various embodiments, the linear actuator 140 is a lead screw drive mechanism, an electrically controlled hydraulic cylinder, or an electrically controlled cylinder.

As shown in FIGS. 2-3, the diaphragm separating device 100 has two sets of diaphragm sweeping mechanisms 120, 120, a first set of diaphragm sweeping mechanism 120 being disposed at a first side of the diaphragm bin 110, and a second set of diaphragm sweeping mechanism 120 being disposed at an opposite second side of the diaphragm bin 110. The system has two linear actuators 140, 140, a first linear actuator 140 being disposed at the first side of the diaphragm bin 110 for driving the first set of diaphragm sweeping mechanism 120, and a second linear actuator 140 being disposed at the second side of the diaphragm bin 110 for driving the second set of diaphragm sweeping mechanism 120.

As shown in FIG. 2, the system for feeding a diaphragm further includes a mounting base 101, on which the diaphragm bin 110 and the pair of sliding rails 130, 130 are mounted. The mounting base 101 has a pair of upright support walls 102, 102. The diaphragm bin 110 is mounted on tops of the pair of upright support walls 102, 102, and the pair of sliding rails 130, 130 is mounted outside the pair of upright support walls 102, 102, respectively.

A method for feeding a diaphragm, comprises steps of:

S100: providing the above-mentioned system for feeding a diaphragm;

S200: turning on the diaphragm sweeping mechanism 120 for performing a sweeping action;

S300: turning off the diaphragm sweeping mechanism 120 after the diaphragm sweeping mechanism 120 has performed a sweeping action for a predetermined time;

S400: turning on the visual device 200 to identify whether the diaphragm sweeping mechanism 120 successfully separated a single diaphragm 10 from at least one stack of diaphragms 10;

S500: if the visual device 200 identified the separated single diaphragm 10, then the visual device 200 identifies the position of the single diaphragm 10 so as to direct a robot or manipulator to pick up the single diaphragm 10, and if the visual device 200 did not identify the separated single diaphragm 10, then going back to step S200.

It should be appreciated by those skilled in the art that the above embodiments are intended to be illustrative, modifications may be made to the above embodiments by those skilled in the art, and structures described in various embodiments may be freely combined without having structural or principle conflict.

Although some embodiments of the general concept of the present disclosure have been shown and described, it would be appreciated by those skilled in the art that modifications may be made to these embodiments without departing from the principles and spirit of the disclosure, the scope of which is defined in the claims and their equivalents.

What is claimed is:

1. A system for feeding a diaphragm, comprising:
    a diaphragm separating device adapted to separate a single diaphragm from a stack of diaphragms, the diaphragm separating device includes a diaphragm bin adapted to load the stack of diaphragms and a diaphragm sweeping mechanism adapted to sweep a top of the stack of diaphragms to separate the single diaphragm from the top of the stack, the diaphragm sweeping mechanism including:
    a support frame adapted to move reciprocally in a straight line; and
    a sweeping element mounted on the support frame and adapted to move reciprocally along with the support frame, wherein, when the sweeping element moves reciprocally along with the support frame, the sweeping element sweeps the top of the stack of diaphragms in order to separate the single diaphragm from the top of the stack;
    a sliding rail extending in a straight line along a side of the diaphragm bin, the support frame slidably installed on the sliding rail in order to move reciprocally thereon; and
    a visual device adapted to identify the single diaphragm and a position of the single diaphragm separated from the stack.

2. The system for feeding a diaphragm according to claim 1, wherein the sliding rail comprises a pair of sliding rails extending in a straight line and provided at a pair of opposite sides of the diaphragm bin, the support frame is slidably installed on the pair of sliding rails in order to move reciprocally along the pair of sliding rails.

3. The system for feeding a diaphragm according to claim 2, wherein the support frame includes a pair of support vertical arms having a pair of lower portions slidably installed on the pair of sliding rails.

4. The system for feeding a diaphragm according to claim 3, wherein the support frame includes a support transverse arm having a pair of opposite ends connected to a pair of upper portions of the pair of support vertical arms, the sweeping element is mounted on the support transverse arm.

5. The system for feeding a diaphragm according to claim 4, wherein the sweeping element comprises a sweeping brush, and wherein the support frame includes a pair of brush connecting parts mounted on the support transverse arm.

6. The system for feeding a diaphragm according to claim 5, wherein the pair of brush connecting parts are adapted to be connected to a pair of ends of the sweeping brush to mount the sweeping brush on the support transverse arm in a suspended manner.

7. The system for feeding a diaphragm according to claim 3, further comprising a linear actuator adapted to drive the diaphragm sweeping mechanism to move reciprocally in the straight line.

8. The system for feeding a diaphragm according to claim 7, wherein the linear actuator is connected to one of the support vertical arms to drive the support vertical arm to move reciprocally along one of the sliding rails.

9. The system for feeding a diaphragm according to claim 7, wherein the linear actuator is a lead screw drive mechanism, an electrically controlled hydraulic cylinder, or an electrically controlled cylinder.

10. The system for feeding a diaphragm according to claim 7, wherein the diaphragm separating device has a plurality of sets of diaphragm sweeping mechanisms, a first set of diaphragm sweeping mechanisms is disposed at a first side of the diaphragm bin and a second set of diaphragm sweeping mechanisms is disposed at an opposite second side of the diaphragm bin.

11. The system for feeding a diaphragm according to claim 10, further comprising a pair of linear actuators, a first linear actuator is disposed at the first side of the diaphragm bin and drives the first set of diaphragm sweeping mechanisms and a second linear actuator is disposed at the opposite second side of the diaphragm bin and drives the second set of diaphragm sweeping mechanisms.

12. The system for feeding a diaphragm bin according to claim 2, further comprising a mounting base on which the diaphragm bin and the pair of sliding rails are mounted.

13. The system for feeding a diaphragm bin according to claim 12, wherein the mounting base has a pair of upright support walls, the diaphragm bin is mounted on a top of each of the pair of upright support walls, and the pair of sliding rails are mounted outside the pair of upright support walls.

14. A system for feeding a diaphragm, comprising:
a diaphragm separating device adapted to separate a single diaphragm from a stack of diaphragms, the diaphragm separating device includes a diaphragm bin adapted to load the stack of diaphragms and a diaphragm sweeping mechanism adapted to sweep a top of the stack of diaphragms to separate the single diaphragm from the top of the stack, the diaphragm sweeping mechanism including:
a support frame adapted to move reciprocally in a straight line; and
a sweeping brush mounted on the support frame and adapted to move reciprocally along with the support frame, wherein, when the sweeping brush moves reciprocally along with the support frame, the sweeping brush sweeps the top of the stack of diaphragms in order to separate the single diaphragm from the top of the stack, and wherein the support frame is configured to be height-adjustable and the sweeping brush installed on the support frame is height-adjustable to allow a height of the sweeping brush to be matched with the single diaphragm to be separated; and
a visual device adapted to identify the single diaphragm and a position of the single diaphragm separated from the stack.

15. A method for feeding a diaphragm, comprising:
providing a system including a diaphragm separating device adapted to separate a single diaphragm from a stack of diaphragms and a visual device adapted to identify the single diaphragm and a position of the single diaphragm separated from the stack, the diaphragm separating device includes a diaphragm bin adapted to load the stack of diaphragms and a diaphragm sweeping mechanism;
turning on the diaphragm sweeping mechanism to perform a sweeping action to sweep a top of the stack of diaphragms to separate the single diaphragm from the top of the stack;
turning off the diaphragm sweeping mechanism after the diaphragm sweeping mechanism has performed the sweeping action for a predetermined time;
turning on the visual device to identify whether the diaphragm sweeping mechanism successfully separated the single diaphragm from the stack;
identifying the position of the single diaphragm if the visual device identifies the single diaphragm separated from the stack to direct a robot to pick up the single diaphragm; and
repeating the turning steps if the visual device does not identify the single diaphragm separated from the stack.

* * * * *